Oct. 26, 1954  E. A. WILKENSON ET AL  2,692,435
WIND DRIFT COMPUTER FOR BOMBSIGHTS
Filed June 7, 1949  3 Sheets-Sheet 1

Inventors
Per Torsten Faxen
Erik Akver Wilkenson

Oct. 26, 1954　　　E. A. WILKENSON ET AL　　　2,692,435
WIND DRIFT COMPUTER FOR BOMBSIGHTS
Filed June 7, 1949　　　　　　　　　　　　3 Sheets-Sheet 2

Oct. 26, 1954

E. A. WILKENSON ET AL 2,692,435

WIND DRIFT COMPUTER FOR BOMBSIGHTS

Filed June 7, 1949

Inventors
Per Torsten Faxén
Erik Ahser Wilkenson
By

Patented Oct. 26, 1954

2,692,435

UNITED STATES PATENT OFFICE 2,692,435

WIND DRIFT COMPUTER FOR BOMBSIGHTS

Erik Alvar Wilkenson and Per Torsten Faxén, Linkoping, Sweden, assignors to Svenska Aeroplan Aktiebolaget, Linkoping, Sweden, a joint-stock company of Sweden Application June 7, 1949, Serial No. 97,688

2 Claims. (Cl. 33—46.5)

In all bomb dropping the prevailing wind over the target has a most important effect on the bomb's course. The direction and force of the wind at the point in space from which the bombs are dropped must therefore be taken into consideration when lining up the aircraft for the release of the bombs. The speed and direction of the aircraft in relation to the ground will be varied because of the above mentioned wind, which affects the starting speed and direction of the bomb at the time of bomb dropping. Of course, the existing state of the wind in the air space which the bomb must pass through on its course down to the target will have its effect if the force and direction of the wind in that air space differs from the wind conditions at the dropping altitude, but this influence is very small in relation to the above mentioned primary effect of the wind.

During horizontal bombing, that is the bombing method by which the bombs are dropped when the aircraft, for instance an airplane, is being flown on a substantially horizontal course, the compensation for the wind influence is usually made in such a way that the sighting angle which the applied sighting means of the bombsight would have during a calm, is varied in accordance with the wind influence on the bomb's course, whereby the aiming line along which the target will be observed when the bombs are dropped receives a certain correction.

During dive bombing, that is the bombing method by which bombs are dropped while the aircraft is diving on the target, the correction for the wind influence takes place in a somewhat different manner. Considering their differences in this respect, the known dive bombing sights can be divided into two groups.

The first group has no special wind drift computer device but is constructed so that if the aiming point, that is the point which the extension of the aiming line will intersect when the aircraft is lined up on the target, fixes upon the target, the target is hit only if there is no wind. When using these types of bomb sights, therefore, the aiming point is not fixed on the target but on an estimated point on the weather side of the target at a distance from the same equal to the wind force at the dropping altitude multiplied by the dropping time.

The second group of dive bombing sights is provided with means for making an adjustment to the optical sight in accordance with the assumed wind force component in the aircraft flight direction, and the optical sight is proportionally displaced from the position which it would have for bombing in calm air. However, this type of correction takes account only of the wind component which is parallel to the aircraft flight path during the bombing run, and consequently permits the optical sight axis to be fixed precisely on the target only when the aircraft has a direct head or tail wind; if the wind has any lateral component relative to the flight path, the point of aim must be displaced to one side or the other of the target to compensate for this wind drift component.

In bomb dropping during the pull out, which is a special form of dive bombing wherein the bombs instead of being dropped during the actual dive are not released until the pull-out that follows, there is another known method to compute the wind, namely to have the bombs released, by means of special devices, somewhat earlier or later than would be correct if no wind existed. In this case, too, however, it is necessary to change the aiming point whenever the direction of the wind and the aircraft flight path are not parallel.

Therefore, when using hitherto known dive bombing release sights, it was necessary to compute the changing of the aiming point caused by the wind influence, at least if the release was not being done in a straight tail or head wind. This method necessitated an estimation on the part of the bomb aimer of a distance on the ground or on a water surface by which the aiming point had to be displaced from the target.

This was, of course, difficult, considering the short time at his disposal for such an estimation. A further difficulty was that the correct extent of the above mentioned distance was being altered during the dive because the fall time of the bomb decreases with decreasing altitude. Accordingly, the bomb aimer also had to estimate or know the fall-time which depends upon the altitude, speed and diving angle of the aircraft.

Of course, the afore-mentioned circumstances have a detrimental effect on the precision which can be obtained during dive bombing, especially when the release has to take place in a cross wind. It is obvious that a considerably better result could be obtained and the tasks of the bomb aimer simplified if the present bomb sight included or were supplemented by a generally applicable device for computing the aiming line with regard to the wind influence on the bomb's course.

It is obviously desirable that a device of the type in question not only give correct computations both in range and in deflection but also that it function automatically and continually during a dive so that the bomb aimer during this time will not be burdened with the work of changing adjustments and the like. The bomb aimer should therefore be able to aim directly on the target during the entire lining up procedure and undisturbed, devote himself to doing this with the greatest possible precision, while at the same time the bombs will be released with an accurate correction for wind conditions. The invention which will be described below provides for the above mentioned requirements.

This invention is based upon the assumption that the wind at the dropping altitude is known to the bomb aimer both in direction and velocity and becomes the subject of an adjusting procedure. Usually, the above mentioned information is obtainable for the flying personnel through weather reports or through navigational measuring.

The invention in question is a wind computer for bomb-sights to be used in dive bombing. This computer is characterized by (a) a gimbal mounted gyroscope, which indicates the existing wind direction; (b) a wind correction instrumentality or control connected to this gyroscope and adjustable in accordance with the prevailing wind direction and velocity; (c) a mechanism arranged between the above mentioned wind correction control and the aiming means of the bomb sight to correct the direction of the aiming line determined by the aiming means in relation to the aircraft and depending upon the temporary direction of the rotor axis of the gyroscope in relation to the aircraft and the adjusted wind force.

In the following description the function of the wind drift computer will be further brought out and exemplified. For the calculations that must be done, we assume a rectangular, three dimensional axis system $xyz$ with an origin fixed on the target for the bomb release. Assume further that the $z$-axis is vertical and that the $y$-axis is perpendicular to the line of course of the aircraft.

The following indications are assumed:

$u$ = the wind velocity; that is the magnitude of the projection on the ground of the wind velocity vector prevailing at the dropping altitude and referred to the axis system $xyz$. The influence of this wind force is to be accounted for by the wind drift computer of this invention.

$\omega$ = the angle of deflection of the wind; that is the angle between the projections in the ground plane $xy$ of the heading of the aircraft and the above mentioned wind velocity vector. Heading, hereafter, means the flying direction of the aircraft in relation to the surrounding air, which approximately corresponds with the longitudinal axis of the aircraft.

$b$ = the chord of the bomb course corrected for wind drift but as it would be in still air; that is, the connecting line between the position of the bomb at the instant of release and the point to which it will fall if it were released with a wind drift correction but no wind were blowing, said point to which it will fall being a distance upwind from the origin equal to the wind drift on the bomb multiplied by its time of fall.

$b_0$ = the chord of the still air bomb course; that is, the connecting line between the position of the bomb at the release instant and the aiming point in the $xy$ plane when the wind velocity is zero ($u=0$).

$\varphi$ = the angle between the chord $b_0$ and the ground plane $xy$.

$d$ = the wind drift; that is the distance in the $xy$-plane between the base points for the chords $b$ and $b_0$.

$d_1$ = the projection of the wind drift on the $x$-axis.

$d_s$ = the projection of the wind drift on the $y$-axis.

$\delta_1$ = the longitudinal wind correction angle; that is the angle defined by the pair of lines connecting the aircraft with each end of the vector $d_1$ at the bomb release moment.

$s$ = the cross wind correction angle; that is the angle defined by a pair of lines extending from the aircraft to each end of the vector $d_s$ at the bomb release moment.

$v_B$ = the average speed of the projection of the bomb on the chord $b_0$, that is, $b_0$ divided by time of fall of the bomb.

$t_B$ = the fall time of the bomb; that is the time elapsing between the bomb release moment and the moment that the bomb hits the $xy$-plane.

$\alpha$ = the angle between the rotor axis of the gyroscope and its outer gimbal axis.

$\beta$ = the angle between the rotor axis of the gyroscope and its inner gimbal axis.

$\omega_g$ = the angle between the projections in the ground plane of the wind vector $u$ and the rotor axis of the gyroscope.

$\varphi_g$ = the angle between the rotor axis of the gyroscope and the ground plane.

$\Delta\omega = \omega - \omega_g$ (= the angle between the projections in the ground plane of the aircraft's heading and the rotor axis of the gyroscope).

$\Delta\varphi = \varphi - \varphi_g$ (= the difference between the slope of the gyroscope's rotor axis and the chord $b_0$ relative to a vertical line, whereby the chord $b_0$ is identical with the uncorrected focussing line of the bomb sight. See below).

Taking into consideration that the magnitude $d$ is comparatively small in proportion to the magnitude $b_0$, the following computations can be drawn:

$$d = u . t_B$$

$$v_B = \frac{b_0}{t_B}$$

$$d_1 = d \cos \omega$$

$$d_s = d \sine \omega$$

$$\delta_1 = \frac{d_1 \sine \varphi}{b_0} \delta_1 \text{ in radians}$$

$$\delta_s = \frac{d_s}{b_0} \delta_s \text{ in radians}$$

From this is obtained:

$$\delta_1 = \frac{u}{v_B} \cos \omega \sine \varphi \quad (1)$$

$$\delta_s = \frac{u}{v_B} \sine \omega \quad (2)$$

or if the gyro angles are introduced:

$$\delta_1 = \frac{u}{v_B} \cos (\omega_g + \Delta\omega) \sine (\varphi_g + \Delta\varphi) \quad (3)$$

$$\delta_s = \frac{u}{v_B} \sine (\omega_g + \Delta\omega) \quad (4)$$

As is evident from the foregoing, the wind drift computer of this invention is intended to be connected to a bomb sight, which bomb sight is assumed to be of such construction that the target will be hit if the bomb is dropped in a calm—that is, the above defined wind $u=0$—and the aiming line of the bomb sight at the dropping moment coincides with the above mentioned chord $b_0$ (disregarding a slight parallax error owing to the distance between the bomb sight and the bomb rack in the aircraft).

From the above calculations it appears that a hit on the target can be obtained with the same bomb sight and the same procedure as above mentioned, even if the wind $u$ is not $=0$, provided that the direction of the aiming line (optical sight axis) is corrected in range and deflection by the angles $\delta_1$ and $\delta_s$ respectively, and the aiming line corrected in this manner will then coincide with the above mentioned chord $b$.

The wind drift computer of the invention is constructed in such a way that the angles $\delta_1$ and $\delta_s$ are automatically calculated during the dive on the target according to the Equations 3 and 4, which is done in the following manner.

The wind velocity $u$ is assumed as being known as well as its direction, and both of these may be obtained through weather reports or navigational calculations.

The average speed of the bomb $v_B$—which is comparatively uniform for each type of aircraft (airplane)—can through experience be calculated with sufficient accuracy. The magnitude of $v_B$ is dependent mainly upon the flying condition of the aircraft when it enters into the dive that precedes the release.

Before the dive, the bomb aimer is therefore able to adjust the value $$\frac{u}{v_B}$$

on the wind control of the wind drift computer.

The angles $\omega_g$ and $\varphi_g$ can be constants chosen at the time of construction of the wind drift computer, and these angles presume that the rotor axis of the gyroscope is adjusted (put to zero) at corresponding angles through measurements on the part of the bomb aimer before the dive. This requires that the direction of the wind $u$ be known, which is the case as stated above.

The angles $\Delta\omega$ and $\Delta\varphi$ are determined automatically by the gyroscope in terms of functions of $\alpha$ and $\beta$, which functions depend only upon the position of the gimbal suspension relative to the longitudinal axis of the aircraft and the uncorrected aiming line of the bomb sight.

The Equations 3 and 4 can thus be written $$\delta_1 = \frac{u}{v_B} \cdot f_1(\alpha, \beta) \quad (5)$$

$$\delta_s = \frac{u}{v_B} \cdot f_s(\alpha, \beta) \quad (6)$$

where $f_1$ and $f_s$ are fixed trigonometrical functions of the gyroscope's pivoting angles around the two gimbal axes.

If $\omega_g = \varphi_g = 0$ is selected as a special case, the following are obtained from the Equations 3 and 4:

$$\delta_1 = \frac{u}{v_B} \cdot \cos \Delta\omega \, \text{sine} \, \Delta\varphi \quad (7)$$

$$\delta_s = \frac{u}{v_B} \cdot \text{sine} \, \Delta\omega \quad (8)$$

If the gyroscope is so mounted that the outer gimbal axis becomes vertical in normal horizontal flight (at least approximately), and if the inner gimbal axis is perpendicular to the other, the following combinations are valid:

$$\tan \alpha = \frac{\tan \Delta\omega}{\cos \Delta\varphi} \quad (9)$$

$$\text{sine} \, \beta = \cos \Delta\omega \, \text{sine} \, \Delta\varphi \quad (10)$$

The Equations 7, 8, 9 and 10 will give $$\delta_1 = \frac{u}{v_B} \text{sine} \, \beta \quad (11)$$

$$\delta_s = \frac{u}{v_B} \cos \beta \, \text{sine} \, \alpha \quad (12)$$

In order that the invention may be more readily understood and carried into effect, an embodiment of it based upon the particular cases (7), (8), (11) and (12) of the general equations (5) and (6), will now be described with reference to the accompanying drawing, in which.

Figure 3:
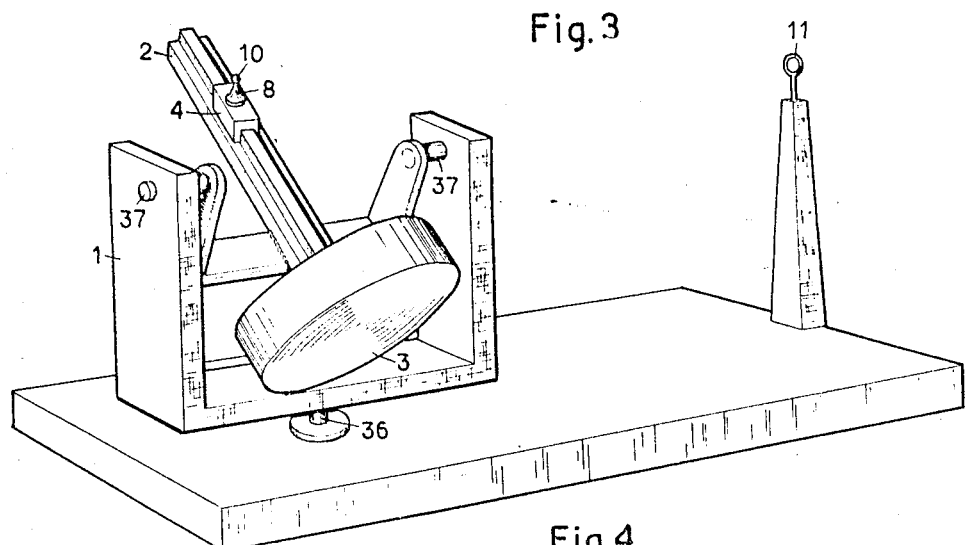
Figure 3 is a side perspective view of another embodiment of the invention.

In Figure 3, the reference 1 indicates a yoke mounted for free rotation on a vertical pivot 36 journaled in the base of the wind drift computer. The reference 2 indicates a guide rail mounted in the yoke for freely swinging movement about a pivot 37 the axis of which is at right angles to and intersects the axis of the pivot 36. A gyroscopic rotor housing 3 is fixed at one end of said guide rail with the rotor axis parallel to the guide rail and a slide 4 is slidably adjustable along said guide rail.

An ocular element 11 belonging to the bomb sight (which is not shown) is fixed or movable depending upon the type of the bomb sight. At the top end of a fixed post 8 is an objective 10. (This objective is intended to be substituted for the ordinary sighting reticule used for bomb sights.) The objective 10 is mounted on a post 8 on the slide 4 in such a way that the center of the objective coincides with the intersectional point of the axes of the pivots 36 and 37 when the slide 4 takes a position on the guide rail 2 which can be called 0-position for the slide 4. The wind drift computer of Figure 3 functions in the following manner:

The base of the wind drift computer is mounted in the aircraft in such a way that an assumed connecting line between the center of the ocular element and the intersecting point of the axes of the pivots 36 and 37 will form the aiming line (with the wind uncomputed) of the bomb sight which is not shown. Furthermore, the wind drift computer is suitably fixed in such a position that the axis of the pivot 36 will be substantially vertical in normal level flight.

The bomb aimer must then adjust the slide 4 along the guide rail 2 to a position corresponding to the distance $s.u$ from the above specified 0-position, where $u$ is the wind velocity at dropping altitude, obtained through weather reports and navigational calculations, and $$s \text{ is a scale factor} = \frac{1}{v_B}$$

(see above).

Alternatively, the scale factor $s$ can be taken as a constant and in that case the ocular element 11 would have to be adjusted to a distance $s.v_B$ from the intersecting point for the center lines of the pivot axes 36 and 37, the mounting of the computer and/or that of the ocular element 11 being movable to permit relative adjustment of these two elements toward and from one another.

After this, the bomb aimer must adjust the guide rail 2 parallel to the wind direction prevailing at the dropping altitude in question which is likewise known. The guide rail is then kept in this position by the inertia of the gyroscope.

If the aircraft is maneuvered to start a dive for bombing or otherwise to change its course or heading, the guide rail 2 will, due to the inertia of the gyroscope, rotate in relation to the aircraft, in doing which the objective 10 will be subject to a displacement corresponding to the rotation of the guide rail and the geometry of the device. If the bomber now uses the connecting line between the ocular element 11 and the objective 10 instead of the aiming line of the bomb sight originally computed for zero wind, he will be able to aim correctly at the target. That this is correct will be readily seen from the fact that the triangle defined by the ocular element 11, the intersecting point for the pivot axes 36 and 37 and the objective 10 is geometrically similar to the larger triangle having the wind drift $d$ and the chords $b$ and $b_0$ (see above) as sides, and the Equations 7 and 8 are thus satisfied.

Figure 4:
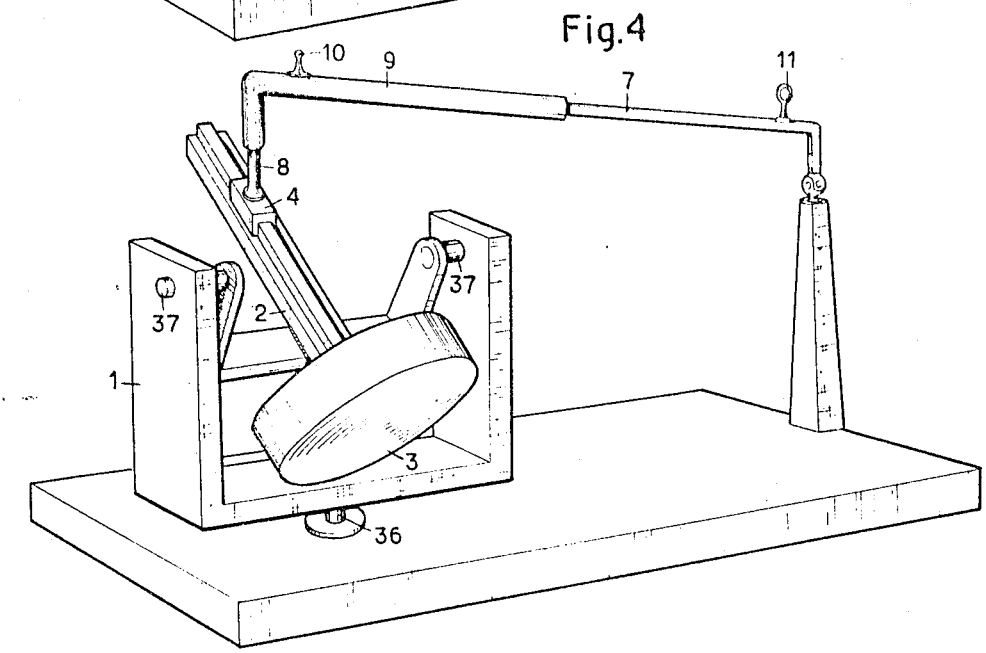
Figure 4 is a view similar to Figure 3 but showing a modified version of the Figure 3 embodiment.

The device shown in Figure 4 constitutes a modification of the Figure 3 embodiment just described in that the objective 10 and the ocular element 11 are located on the lever 7, 9, which is telescopically extensible and universally pivoted about the same points which constituted centers for the objective and the ocular element in the embodiment of the wind computer according to Figure 3.

Figure 1:
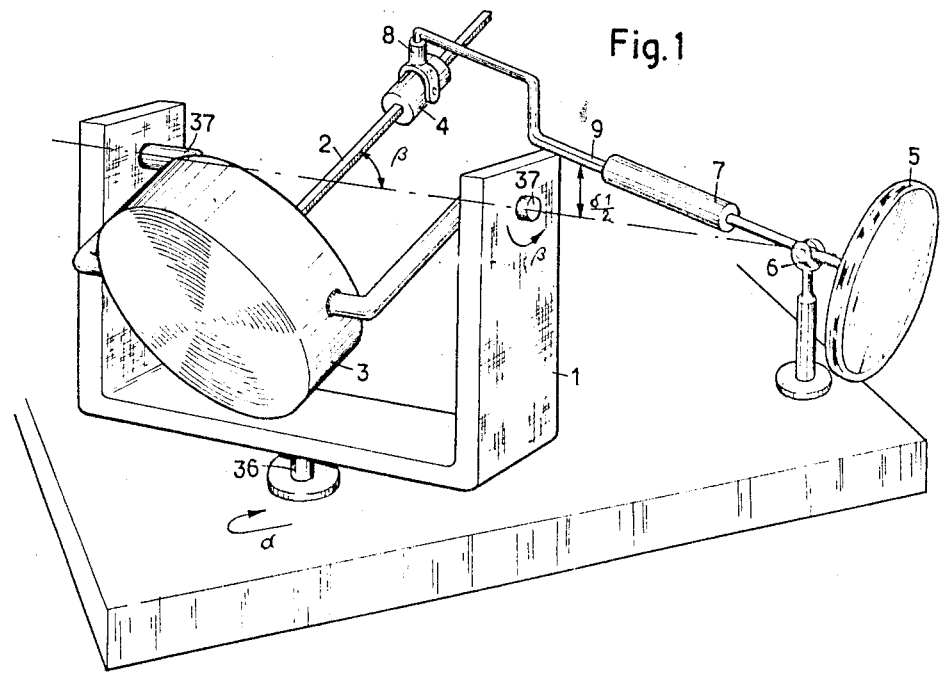
Figure 1 is a side perspective view of a mechanism embodying the principles of this invention.
Figure 2:
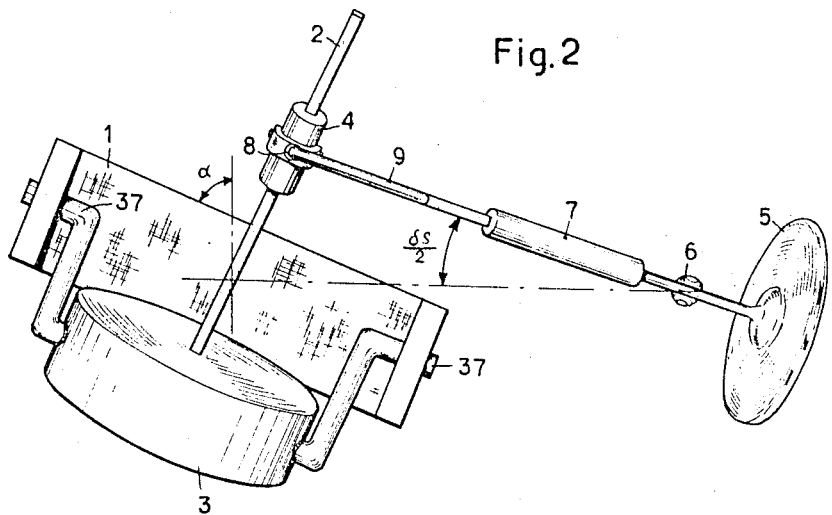
Figure 2 is a perspective view of the Figure 1 embodiment of the invention as seen from above.

Figures 1 and 2 show an embodiment in which the telescoping lever 7, 9 (corresponding both in construction and function to the telescopingly extensible lever 7, 9 of the Figure 4 embodiment), has been arranged to transmit its movements to a mirror 5, which is universally pivoted about a ball 6. This mirror is intended to constitute part of the optical system with which certain bomb sights are equipped. The mirror is located in such a manner that the aiming line uncorrected for the wind will be deflected the corresponding correction angles $\delta_1$ and $\delta_s$ by the reflection of the mirror. It will be seen that the angles through which the mirror must be deflected will be $$\frac{\delta_1}{2} \text{ and } \frac{\delta_s}{2}$$

respectively, which may easily be accomplished by the selection of appropriate scales for the wind velocity adjustment control.

Other designs of the wind drift computer also come within the scope of the invention. Thus Figure 5 shows an embodiment in which the mechanical instrumentalities shown in Figures 1-4 are partially replaced by electrical instrumentalities.

Figure 5:
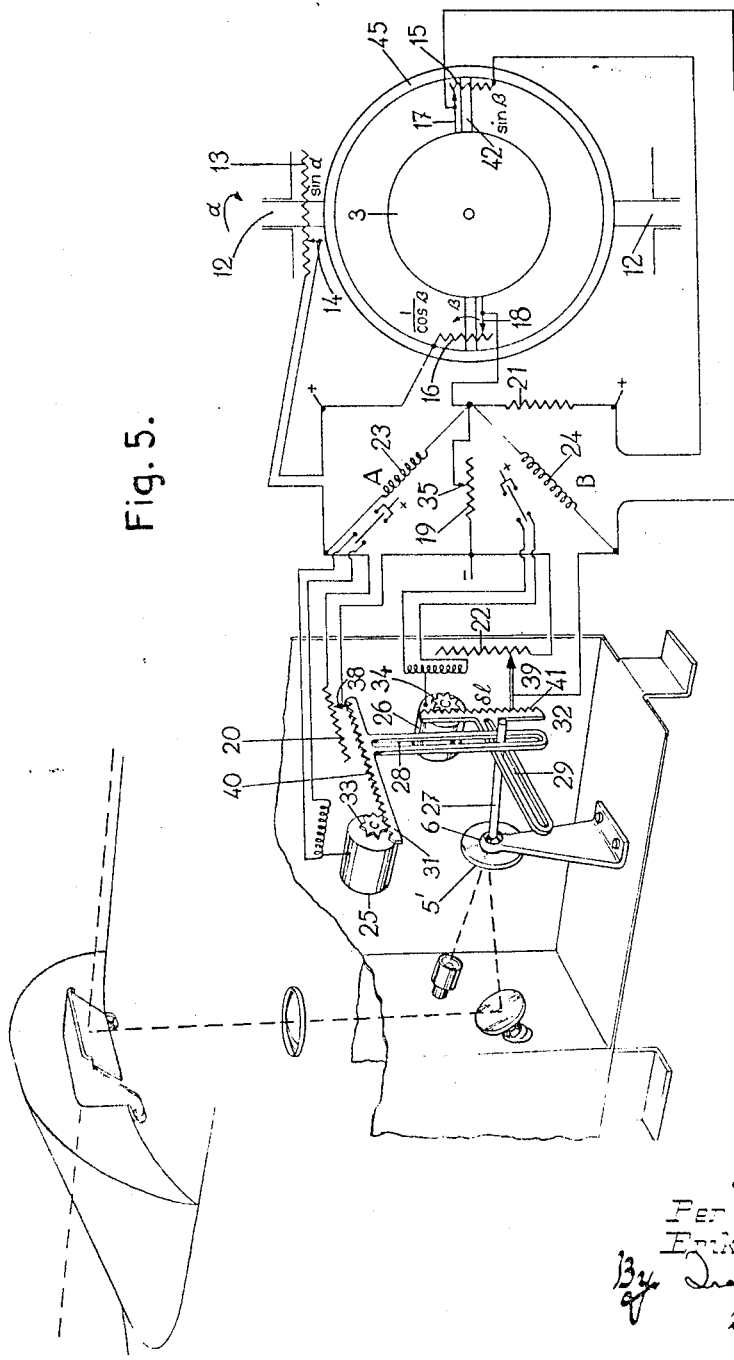
Figure 5 is a diagrammatic view of another embodiment of the invention employing electrical instrumentalities.

In Figure 5 the reference 3 designates the gimbal mounted rotor casing of a gyroscope, the outer gimbal ring 45 of which is pivoted about a vertical bearing 12. The reference 13 designates a rheostat, the movable contact 14 of which is operated by the outer gimbal ring 45. Two rheostats 15 and 16 are secured to the outer gimbal ring, the movable contacts 17 and 18 respectively of which are operated by the rotor casing 3 pivoting about the inner gimbal bearing 42.

Each of the rheostats 13 and 16 comprises one branch of a bridge circuit A, the two other branches of which consist of firstly a rheostat 19 comprising the wind adjustment control and secondly a rheostat 20 connected with the movable aiming device 5' of the bomb sight to be moved in unison therewith.

The rheostat 15 and a fixed resistance 21 comprise two branches of another bridge circuit B, the other two branches of which consist of the rheostat 19 just mentioned and another rheostat 22, also connected with the movable aiming device 5' of the bomb sight, for movement in unison therewith.

Polarized relays 23 and 24 respectively are connected diagonally across the bridge circuits above mentioned. The relay 23 operates an electric motor 25 which moves the aiming device horizontally, while the relay 24 operates another motor 26 which displaces the aiming device vertically. A lever 27 is secured to the aiming device or to part thereof, which in the case shown in Figure 5 consists of a mirror 5' universally pivoted at the point 6. The lever 27 is inserted into a vertical slot 28 in the slide 31, said slide being horizontally operated by the motor 25 by means of a rack 40 on the slide meshing with a pinion 33 on the shaft of the motor 25, and into a horizontal slot 29 in another slide 32, said slide being vertically operated by the motor 26 by means of a rack 41 on the slide meshing with a pinion 34 on the shaft of the motor 26.

The slots 28 and 29, just mentioned, are disposed at right angles to the direction of sliding motion of their respective slides so that the lever 27 will pass through the two slots at a point where these intersect each other. When the motor 25 is operating, the slide 31 will swing the mirror 5' sideways, while, when the motor 26 is operating, the slide 32 will swing the mirror vertically.

The Figure 5 device is used and works in the following manner:

The gyroscope should be adjusted with its axis of rotation parallel to the wind direction prevailing at the bomb dropping altitude above the target. The movable contact 35 of the rheostat 19 is calibrated in terms of wind velocity and it is adjusted to a value of a resistance proportional to the wind velocity at the bomb dropping altitude. When the gyroscope is rotated in relation to the aircraft as a result of a change of heading of the airplane or because the airplane is climbing or diving the gyroscope will move the movable contacts 14, 17 and 18 respectively of the rheostats 13, 15 and 16, thereby changing the resistances of the bridge circuits. The unbalance arising in any of the bridge circuits will create an electric current through the diagonal branch 23 or 24 of the affected bridge circuit. Due to the direction of the said current the polarized relay in the diagonal branch will close in one or the other direction, causing the reversible motor 25 or 26 which is controlled by this relay to start in the corresponding direction. The motor will then move its associated slide 31 and 32, as the case may be, in a direction corresponding to the rotating direction of the motor, swinging the mirror 5 in the corresponding direction. The movable contacts 38 and 39, incorporated in the rheostats 20 and 22 respectively, are located on the slides 31 and 32 respectively and are movable with these so that the magnitude of the resistance in each rheostat will be changed in a direction compensating the unbalance in its corresponding bridge circuit A or B. When the balance in the bridge has been reestablished, the current through its diagonal branch will cease, the relay of this branch switching off the current through its motor.

Since the bearing 12 of the outer gimbal ring 45 of the gyroscope is mounted with its axis parallel to the vertical axis of the aircraft, the rheostat 13 should be wound in such a manner that upon change in the attitude of the aircraft the resistance obtained in the rheostat will vary in the ratio sine $\alpha$. At the same time the magnitude of the resistance of the rheostat 15 will change in proportion to sine $\beta$ and the resistance obtaining in the rheostat 16 in proportion to $$\frac{1}{\cos \beta}$$

where $\alpha$ and $\beta$ are the above mentioned angles, indicated in Figure 5. The resistance obtaining in the rheostat 19 constituting the wind adjustment control should correspond to the value $$\frac{u}{v_B}$$

Then the motor 25 will swing the mirror 5' at such an angle that the aiming line of the aiming device will pivot at an angle $$\frac{u}{v_B} \cdot \text{sine } \alpha \cos \beta$$

about a horizontal axis parallel to the transverse direction of the aircraft, while the motor 26 will swing the mirror in such a manner that the aiming line will be pivoted at an angle $$\frac{u}{v_B} \cdot \text{sine } \beta$$

about a vertical axis, i. e. corresponding to the Equations 11 and 12 above.

It has previously been indicated that the average speed $v_B$ of the bomb can be obtained by estimation. However, more favorable values may be obtained from tables and such if certain bomb dropping factors are known.

The gyroscope used with the wind computer may also consist of a gyroscope incorporated in the bomb sight.

It will be readily apparent that in the wind computer of Figure 5 the two bridge circuits A and B could be separated from each other, with the rheostat 19 divided into two equal rheostats, one for each bridge.

It will also be apparent that in the wind computer of Figure 5 some or all resistance of the elements could be replaced by electrical parts of another type such as inductances, capacitances and such.

What we claim is:

1. Means for angularly displacing the optical axis of an aircraft dive bombing sight with respect to the longitudinal axis of the aircraft to compensate for prevailing wind conditions and thereby enable accurate bombing upon alignment of said optical axis with the target, said means comprising: a gyroscope; means for mounting the gyroscope in the aircraft for universal movement thereof with respect to the aircraft so that the gyroscope may be set with its rotor axis in line with the wind direction and can maintain said position despite changes in attitude and flight direction of the aircraft; motion producing means responsive to relative angular displacement of the gyroscope rotor axis with respect to the longitudinal axis of the aircraft for producing motion of a directing element with respect to the aircraft which motion corresponds in sense with the direction of such displacement; manually adjustable means calibrated in terms of wind velocity and connected with said motion producing means for dictating the magnitude of said motion; and motion transmitting means for connecting said directing element with the bombing sight to angularly displace the optical axis of the bombing sight by an amount and in a direction related to the velocity and direction of the wind.

2. In an aircraft designed for dive bombing: a bombing sight; means mounting the bombing sight in the aircraft with a part thereof movable to angularly displace the optical axis of the bombing sight to and from a position of parallelism with respect to the longitudinal axis of the aircraft; means for moving said part of the bombing sight to angularly displace its optical axis to and from parallelism with the longitudinal axis of the aircraft to compensate for prevailing wind conditions and thereby enable accurate bombing upon alignment of said optical axis with the target, said means comprising, a gyroscope, means mounting the gyroscope in the aircraft for universal movement thereof with respect to the aircraft so that the gyroscope may be set with its rotor axis in line with the wind direction and can maintain said position despite changes in attitude and flight direction of the aircraft, motion producing means responsive to relative angular displacement of the gyroscope rotor axis with respect to the longitudinal axis of the aircraft for producing motion of a directing element with respect to the aircraft which motion corresponds in sense with the direction of such displacement; manually adjustable means calibrated in terms of wind velocity and connected with said motion producing means for dictating the magnitude of said motion; and motion transmitting means connecting said directing element with said part of the bombing sight to move the same and thereby angularly displace the optical axis of the bombing sight by an amount and in a direction related to the velocity and direction of the wind.

References Cited in the file of this patent

UNITED STATES PATENTS

| Number | Name | Date |
|---|---|---|
| 1,206,481 | Stanworth | Nov. 28, 1916 |
| 1,314,428 | Pollen et al. | Aug. 26, 1919 |
| 1,446,280 | Titterington | Feb. 20, 1923 |
| 1,573,028 | Bates | Feb. 16, 1926 |
| 2,027,348 | Procofieff-Seversky | Jan. 7, 1936 |
| 2,371,606 | Chafee et al. | Mar. 20, 1945 |
| 2,408,356 | Willard | Sept. 24, 1946 |
| 2,410,058 | Frische et al. | Oct. 29, 1946 |
| 2,410,097 | Morgenthaler | Oct. 29, 1946 |
| 2,410,468 | Van Auken et al. | Nov. 5, 1946 |
| 2,421,749 | Freeman | June 10, 1947 |
| 2,438,532 | Barth | Mar. 30, 1948 |
| 2,439,381 | Darlington | Apr. 13, 1948 |
| 2,529,324 | Blackett et al. | Nov. 7, 1950 |

FOREIGN PATENTS

| Number | Country | Date |
|---|---|---|
| 582,975 | Great Britain | Oct. 25, 1939 |